(12) United States Patent
Kim et al.

(10) Patent No.: US 12,505,160 B2
(45) Date of Patent: Dec. 23, 2025

(54) METHOD AND APPARATUS FOR REGISTERING METADATA OF DRONE IMAGE

(71) Applicant: Electronics and Telecommunications Research Institute, Daejeon (KR)

(72) Inventors: Beob Kyun Kim, Daejeon (KR); Chae Deok Lim, Daejeon (KR); Kyung Il Kim, Daejeon (KR); Young Bin Kim, Daejeon (KR); Jin Ah Shin, Daejeon (KR); Duk Kyun Woo, Daejeon (KR); Dong Wan Ryoo, Daejeon (KR); Yoo Jin Lim, Daejeon (KR); Yang Jae Jeong, Daejeon (KR); Su Jung Ha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 475 days.

(21) Appl. No.: 18/091,030

(22) Filed: Dec. 29, 2022

(65) Prior Publication Data
US 2023/0239548 A1  Jul. 27, 2023

(30) Foreign Application Priority Data
Jan. 25, 2022  (KR) ......... 10-2022-0010938

(51) Int. Cl.
*G06F 16/783*  (2019.01)
*G06F 16/58*  (2019.01)
*G06F 40/205*  (2020.01)
*G06V 20/17*  (2022.01)

(52) U.S. Cl.
CPC ........ *G06F 16/783* (2019.01); *G06F 16/5866* (2019.01); *G06F 40/205* (2020.01); *G06V 20/17* (2022.01)

(58) Field of Classification Search
USPC ................................................. 382/103, 294
See application file for complete search history.

(56) References Cited

U.S. PATENT DOCUMENTS

| | | |
|---|---|---|
| 8,189,690 B2 | 5/2012 | Whitaker et al. |
| 10,418,068 B2 | 9/2019 | Tran et al. |
| 10,433,028 B2 | 10/2019 | Park et al. |
| 2005/0257241 A1* | 11/2005 | Faulkner ................. G06F 16/78 725/135 |
| 2009/0012995 A1* | 1/2009 | Sartor .................... H04N 21/84 |

(Continued)

FOREIGN PATENT DOCUMENTS

| | | |
|---|---|---|
| KR | 10-2012-0069750 | 6/2012 |
| KR | 10-2015-0014433 | 2/2015 |

(Continued)

*Primary Examiner* — Ishrat I Sherali
(74) *Attorney, Agent, or Firm* — KILE PARK REED & HOUTTEMAN PLLC (57) ABSTRACT

Provided is a method and apparatus for registering metadata regarding a drone image. The apparatus for registering metadata regarding a drone image acquires captured data, and parses metadata from the captured data. The apparatus for registering metadata regarding a drone image generates new metadata using additional information and the parsed metadata, and registers the generated new metadata and the captured data to generate new captured data.

13 Claims, 7 Drawing Sheets

(56) References Cited

U.S. PATENT DOCUMENTS

| | | | | |
|---|---|---|---|---|
| 2009/0040305 A1* | 2/2009 | Krajec | ................... | H04N 5/265 |
| | | | | 348/169 |
| 2011/0090399 A1* | 4/2011 | Whitaker | ................ | G06F 16/78 |
| | | | | 707/769 |
| 2013/0311007 A1 | 11/2013 | Phan et al. | | |
| 2018/0213289 A1 | 7/2018 | Lee et al. | | |

FOREIGN PATENT DOCUMENTS

| | | |
|---|---|---|
| KR | 10-1860310 | 5/2018 |
| KR | 10-2019-0125686 | 11/2019 |
| KR | 10-2177686 | 11/2020 |
| KR | 10-2252060 | 5/2021 |
| KR | 10-2315972 | 10/2021 |
| KR | 10-2340527 | 12/2021 |

\* cited by examiner

METHOD AND APPARATUS FOR REGISTERING METADATA OF DRONE IMAGE

CROSS-REFERENCE TO RELATED APPLICATION

This application claims priority to and the benefit of Korean Patent Application No. 10-2022-0010938, filed on Jan. 25, 2022, the disclosure of which is incorporated herein by reference in its entirety.

BACKGROUND

1. Field of the Invention

The present disclosure relates to metadata registration, and more specifically, to a method and apparatus for registering metadata of a drone image.

2. Discussion of Related Art

Information acquired when a drone conducts a mission includes flight information, such as consecutive positions and attitudes of the drone, and when combined with the flight information, sensor data, such as images and the like, acquired by the drone may fully satisfy the requirements of the mission. For example, in order to analyze a specific object in an acquired image, not only the shape of the object identified from the image but also information, such as the location of the object, the direction in which the object is viewed, and the time at which the object is viewed may be utilized, so there is a need to help extract corresponding information from the flight information of the drone.

There may be a case in which finished drone products or expensive image sensors directly reflect flight information of the drone as metadata in image data, but image data acquired from general pre-fabricated drones may not have metadata fully reflected therein. In order for a self-fabricated drone to reflect metadata in image data, a mission computer of the drone having received inputs from a flight sensor and an image sensor performs a metadata registration task and then transmits the resulting image to the ground.

When there is a need to utilize (combine or convert) information of other sensors and adopt a new metadata standard that is not provided by the existing finished drone, hardware or software setting of the drone needs to be changed, in which case the stability of the mission flight itself may be subject to change, which is undesirable.

SUMMARY OF THE INVENTION

The present disclosure is directed to providing a method and apparatus in which, with respect to a metadata item that is not provided by digital image data acquired by a drone image acquisition device, information acquired through a separate sensor and the like is registered into new metadata without redevelopment or modification of a drone device.

The technical objectives of the present disclosure are not limited to the above, and other objectives may become apparent to those of ordinary skill in the art based on the following descriptions.

According to an aspect of the present disclosure, there is provided a method of registering metadata regarding a drone image, the method including: acquiring, by a registering apparatus, captured data; parsing, by the registering apparatus, metadata from the captured data; generating, by the registering apparatus, new metadata with additional information and the parsed metadata; and acquiring, by the registering apparatus, new captured data by registration of the generated new metadata and the captured data.

In an implementation, the acquiring of the captured data may include acquiring image data and flight information from the drone device as the captured data; the parsing of the metadata includes parsing metadata from the image data; the generating of the new metadata includes using the acquired flight information as the additional information, wherein new metadata is generated using the metadata parsed from the image data and the acquired flight information; and acquiring of the new captured data includes registering the new metadata to an image region of the image data to acquire new image data as the new captured data.

In an implementation, the method may further include storing the flight information in buffers by topics. In this case, the generating of the new metadata may include: acquiring flight information corresponding to a timestamp from a buffer of a corresponding topic according to a pre-generated rule; and generating new metadata using the acquired flight information and the parsed metadata.

In an implementation, flight information corresponding to a reference value may be stored in the buffer, and the reference value may include a universal time coordinated (UTC) or a relative value corresponding to a system time after booting, and the topic may include a location and an attitude of the flight information.

In an implementation, the acquiring of the flight information corresponding to the timestamp may include: acquiring flight information of a data item having a reference value matching the timestamp in the buffer; and when there is no data item having the reference value matching the timestamp, acquiring flight information of a data item having a reference value closest to the timestamp, or acquiring an interpolated value of pieces of flight information belonging to data items having two reference values close to the timestamp, or acquiring a transition value of pieces of flight information belonging to data items having N reference values close to the timestamp.

In an implementation, when the image data is a still image, the timestamp may include one of a photographing time, an imaging time, and a filing time, and when the image data is a moving image, the timestamp may include one of time information of a frame, frame number information of a frame, and relative time information from start of streaming.

In an implementation, the generating of the new metadata may include: generating a generation metadata item list according to a pre-generated rule; acquiring, from the acquired flight information, flight information of a topic corresponding to each item of the generation metadata item list; and acquiring a new item value based on the flight information of the topic acquired for each item and the parsed metadata.

According to another aspect of the present disclosure, there is provided an apparatus for registering metadata regarding a drone image, the apparatus including: an image data acquisition unit configured to acquire image data from data received from a drone device; a flight information acquisition unit configured to acquire flight information from flight information data received from the drone device; and an image-flight information register configured to parse metadata from the image data, generate new metadata using the parsed metadata and the acquired flight information, and register the new metadata to an image region of the image data to acquire new image data.

In an implementation, the image-flight information register may include: a flight information topic-specific manager configured to store the flight information in buffers by topics; a flight information topic-specific reference configured to acquire flight information corresponding to a timestamp from a buffer of a corresponding topic according to a pre-generated rule; a metadata parser configured to parse metadata from the image data; a metadata generator configured to generate new metadata using the acquired flight information and the parsed metadata; and an image-metadata register configured to register the new metadata to an image region of the image data to acquire new image data.

In an implementation, the flight information topic-specific manager may include buffers by topics of flight information, and each of the buffers stores flight information to correspond to a reference value, and the reference value includes a universal time coordinated (UTC) or a relative value corresponding to a system time after booting, and the topic may include a location and an attitude of the flight information.

In an implementation, the flight information topic-specific reference may be configured to: acquire flight information of a data item having a reference value matching the timestamp in a buffer of a certain topic and provide the acquired flight information to the metadata generator, and when there is no data item having the reference value matching the timestamp, acquire flight information of a data item having a reference value closest to the timestamp, acquire an interpolated value of pieces of flight information belonging to data items having two reference values close to the timestamp, or acquire a transition value of pieces of flight information belonging to data items having N reference values close to the timestamp, and provide the acquired flight information, the acquired interpolated value, or the acquired transition value to the metal data generator.

In an implementation, the timestamp, when the image data is a still image, may include one of a photographing time, an imaging time, and a filing time, and when the image data is a moving image, include one of time information of a frame, frame number information of a frame, and relative time information from start of streaming.

In an implementation, the metadata generator may be configured to: generate a generation metadata item list according to a pre-generated rule; acquire, by the flight information topic-specific reference, flight information of a topic corresponding to each item of the generation metadata item list; and acquire a new item value based on the flight information of the topic acquired for each item and the parsed metadata.

The apparatus may further include: an image data storage in which new image data registered with the new metadata is stored; and a flight information storage unit configured to store flight information acquired by the flight information acquisition unit.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, embodiments of the present disclosure will be described in detail with reference to the accompanying drawings so that those of ordinary skill in the art may easily implement the embodiments. However, the present disclosure may be implemented in various different forms and is not limited to the embodiments described herein. In addition, in the drawings, parts irrelevant to the description are omitted in order to clearly describe the present disclosure, and similar reference numerals are attached to similar parts throughout the specification.

In the description, when a part "includes" a certain component, it means that other components may be further included rather than excluding other components unless specifically stated to the contrary.

In the description, expressions written in the singular may be interpreted as the singular or plural unless an explicit term such as "one" or "single" is used.

Also, terms including ordinal numbers, such as first and second, used in the embodiments of the present disclosure may be used to describe elements, but the elements should not be limited by the terms. Terms are used only to distinguish one element from another element. For example, a first element may be called a second element, and similarly, a second element may be called a first element, without departing from the scope of the present disclosure.

In the description, a phrase such as "A or B," "at least one of A and B," "at least one of A or B," "A, B or C," "at least one of A, B and C," or "at least one of A, B, or C" may include any one of the items listed together in the corresponding phrase of the phrases, or any possible combination thereof.

Hereinafter, a method and apparatus for registration metadata regarding a drone image according to embodiments of the present disclosure will be described with reference to the drawings.

Figure 1:
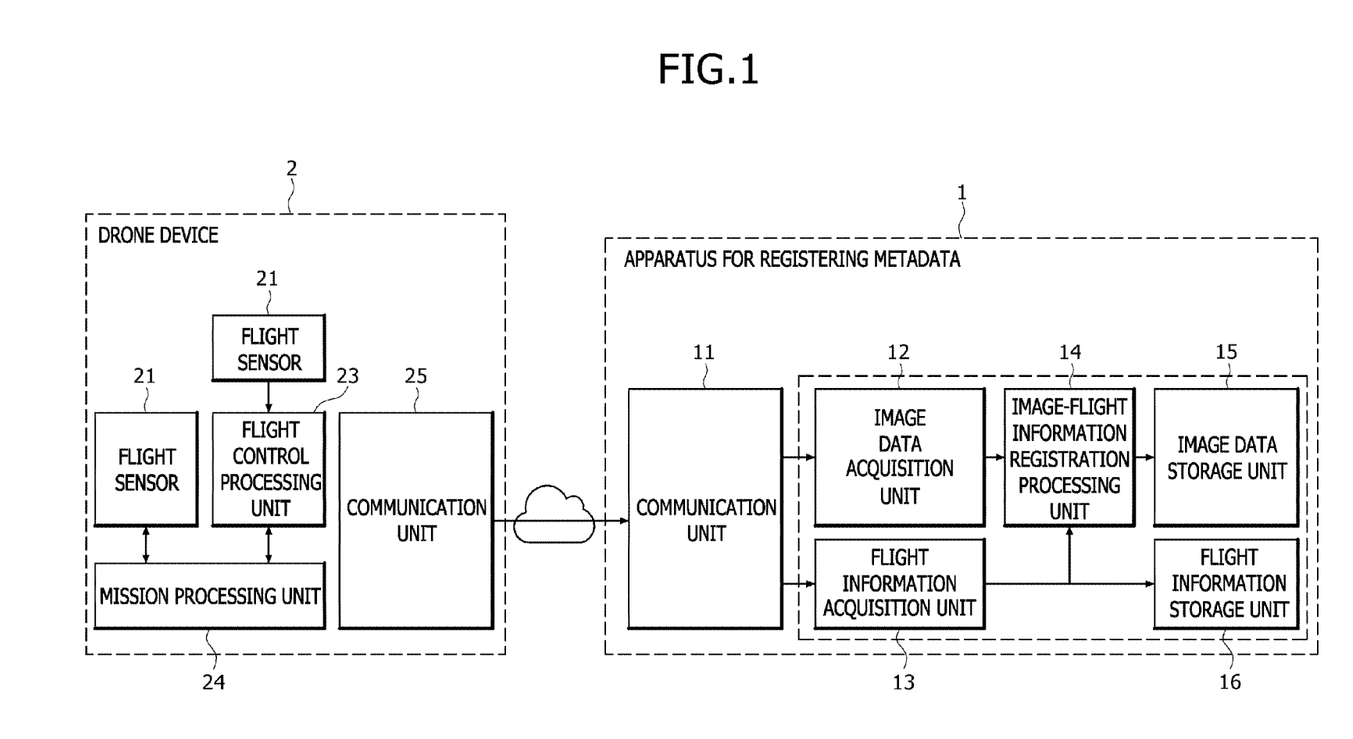
FIG. 1 is a diagram illustrating a structure of an apparatus for registering metadata and a drone device according to an embodiment of the present disclosure.

FIG. 1 is a diagram illustrating a structure of an apparatus for registering metadata and a drone device according to an embodiment of the present disclosure.

An apparatus 1 for registering metadata according to the embodiment of the present disclosure is configured to communicate with a drone device 2 as shown in FIG. 1.

The drone device 2 includes a flight sensor 21, an image sensor 22, a flight control processing unit 23, a mission processing unit 24, and a communication unit 25. The drone device 2 is also referred to as a drone for short.

The flight sensor 21 is configured to generate flight information data. The flight information data includes a location (e.g., a global positioning system (GPS) location), an attitude (a body & sensor attitude), and the like of the drone.

The image sensor 22 is configured to generate image data from photographing of the drone. The image data may include not only an image but also metadata related to the image, such as a photographing direction, a photographing location, and a photographing time in which the image is acquired. The image sensor 22 may also be referred to as a drone image acquisition device, and may include a camera and the like.

The flight control processing unit 23 is configured to control the flight of the drone according to a mission set by the task processing unit 24, and the task processing unit 24 is configured to set a task to be performed by the drone and determine a flight path and the like according to the set task.

As the drone device 2 having such a structure performs the task, flight information data and image data acquired thereby are transmitted to the apparatus 1 for registering metadata through the communication unit 25.

The apparatus 1 for registering metadata is configured to perform metadata registration based on the image data and the flight information data transmitted from the drone device 2. To this end, as shown in FIG. 1, the apparatus 1 for registering metadata includes a communication unit 11, an image data acquisition unit 12, a flight information acquisition unit 13, an image-flight information registration processing unit 14, an image data storage unit 15, and a flight information storage unit 16.

Meanwhile, when the apparatus 1 for registering metadata having such a structure is implemented in a form included in a media server, a communication unit included in the media server may be implemented to perform a function of the communication unit 11.

The communication unit 11 is configured to communicate with the drone device 2, and receive data transmitted from the drone device 2 and transmit the data to each of the image data acquisition unit 12 and the flight information acquisition unit 13.

The image data acquisition unit 12 is configured to acquire image data photographed by the drone device 2 from the data transmitted through the communication unit 11. Here, the image data may include not only an image but also metadata related to the image, such as a photographing direction, a photographing location, a photographing time, an imaging time, a filing time, and the like when the image is acquired. In addition, when the image is a video stream, the image data may include metadata related to the image, such as time information of each frame or frame number information, relative time information from the start of the stream, and the like. That is, the image data is regarded as including an image item and a metadata item.

The flight information acquisition unit 13 is configured to acquire flight information of the drone device 2 from the data (flight information data) transmitted through the communication unit 11. Here, the flight information includes a location, a posture, and the like of the drone.

The image-flight information registration processing unit 14 is configured to register the image data and the flight information transmitted from the image data acquisition unit 12 and the flight information acquisition unit 13, respectively. Specifically, the image-flight information registration processing unit 14 may compare metadata of the received image data with the flight information, thereby performing a registration process in which new metadata is generated or a value of the existing metadata is changed based on a preset generation rule. The metadata generated/changed according to the registration process is input to the metadata item of the image data, and the resulting image data is stored. Unlike the conventional media server, an image with registered metadata is stored, so there is no need to perform separate comparison or registration between image data and flight information.

Figure 2:
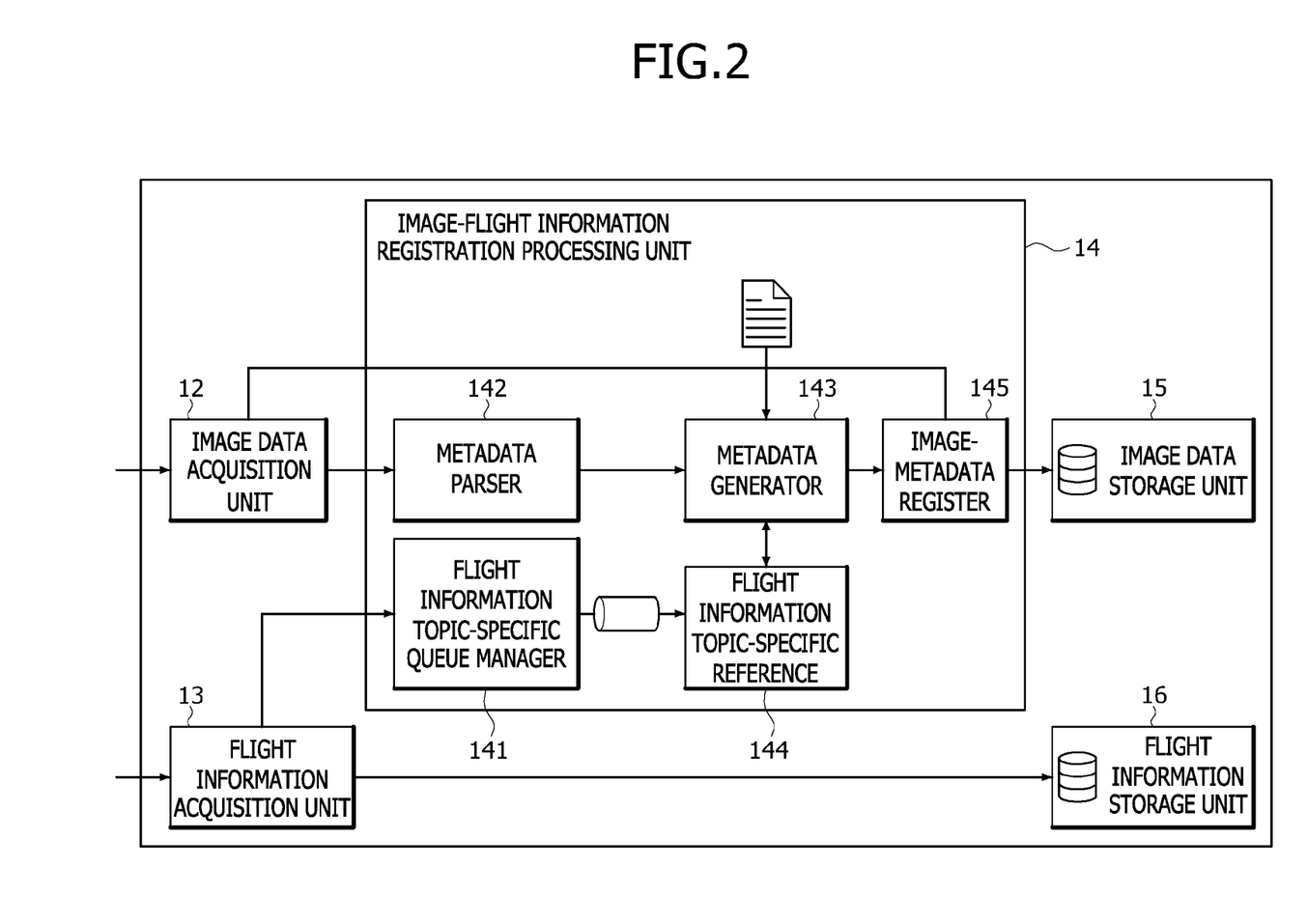
FIG. 2 is a diagram illustrating a structure of an image-flight information registration processing unit according to an embodiment of the present disclosure.

FIG. 2 is a diagram illustrating a structure of an image-flight information registration processing unit according to an embodiment of the present disclosure.

As shown in FIG. 2, the image-flight information registration processing unit 14 to according to the embodiment of the present disclosure includes a flight information topic-specific queue manager 141, a metadata parser 142, a metadata generator 143, a flight information topic-specific reference 144, and an image-metadata register 145.

The flight information topic-specific queue manager 141 is configured to store flight information by topics. Specifically, the flight information topic-specific queue manager 141 is implemented as a buffer in the form of a topic-specific queue data structure such that flight information acquired by the flight information acquisition unit 13 may be referenced during a set time. The size of the buffer may vary depending on the performance of the media server and the required level of the system. In addition, the period of the topic may conform to a flight information generation period set in the drone device 2. Here, the topic may be a location or attitude of flight information. Each data item stored in the topic-specific buffer may be stored based on a universal time coordinated (UTC) or a relative value (a system time after booting, etc.). Here, for the sake of convenience of description, the UTC or the relative value is referred to as a "reference value." Each data item in the topic-specific buffer includes a reference value and flight information corresponding to the reference value. For example, in the case of a buffer having a location as a topic, each data item includes a UTC, which is a reference value, and location data, which is flight information corresponding to the reference value. Flight information (e.g., location data) corresponding to a reference value is also referred to as a "topic value."

The flight information topic-specific reference 144 is configured to provide flight information stored in the flight information topic-specific queue manager 141 to the metadata generator 143. Specifically, the flight information topic-specific reference 144 may, based on a topic-specific timestamp provided from the metadata generator 143, searches for a reference value that is the closest to the timestamp or corresponds to a converted value thereof, and provides flight information (e.g., a topic value) of the reference value to the metadata generator 143. When there is no data item having a reference value exactly matching the timestamp in the topic-specific buffer, the flight information topic-specific reference 144 may provide the metadata generator 143 with one of 1) a topic value of a data item having a reference value closest to the timestamp, 2) an interpolated value of topic values belonging to data items of two reference values close to the timestamp, and 3) a transition value between N topic values belonging to data items of N reference values close to the timestamp.

Here, the flight information topic-specific reference 144 may select a topic buffer corresponding to a topic provided from the metadata generator 143 among the topic-specific buffers of the flight information topic-specific queue manager 141, and search for flight information according to a reference value corresponding to a timestamp in the selected topic buffer.

The metadata parser 142 is configured to parse a value of a defined item among metadata items originally included in the image data. Specifically, the metadata parser 142 parses a value of a predefined item among metadata items of image data acquired by the image data acquisition unit 12 and provides the parsed value of the predefined item to the metadata generator 143. For example, when the predefined item is a photographing direction, the metadata parser 142 parses a value corresponding to the photographing direction, which is metadata regarding the image data, and provides the parsed value to the metadata generator 143. The predefined item may be at least one of metadata items of the image data or may include all of the metadata items.

The metadata generator 143 is configured to generate new metadata based on a preset generation rule. Specifically, the metadata generator 143 generates a metadata value by utilizing values provided from the metadata parser 142 and the flight information topic-specific reference 144 based on a preset generation rule. Here, the preset generation rule may be a new metadata generation rule or a metadata value conversion rule set by a system administrator. Therefore, the metadata value generated by the metadata generator 143 may be a metadata value newly generated based on a metadata item of image data provided from the metadata parser 142 and flight information provided from the flight information topic-specific reference 144 or may be a changed value of the metadata item of the image data and/or the flight information.

In one embodiment, the metadata generator 143 may be configured to, (1) when the received image data is a still image, provide the flight information topic-specific reference 144 with a value of an image acquisition time of the still image (e.g., one of a photographing time, an imaging time, and a filing time) to be used as a timestamp, and then combine a value provided from the flight information topic-specific reference 144 based on the timestamp, that is, flight information (e.g., a location value) with a metadata item (e.g., a photographing direction) provided from the metadata parser 142, to generate combined metadata. The preset generation rule may be a rule that reflects a rule for responding to a standard that varies depending on a sensor used to acquire an image.

In another embodiment, the metadata generator 143 may be configured to, (2) when the received image data is a video stream, provide the flight information topic-specific reference 144 with one of time information of each frame and frame number information, which are included in the video stream, or relative time information from the start of the streaming to be used as a timestamp, and then combine a value provided from the flight information topic-specific reference 144 based on the timestamp, that is, flight information (e.g., a location value) with a metadata item (e.g., a photographing direction) provided from the metadata parser 142, to generate combined metadata. The metadata generated as described above may be stored in a separate metadata format file for all frames or selected frames. In the case of using a transport container standard, such as MPEG-2 TS, the generated metadata that exactly matches a frame may be stored in the image stream itself.

The value of the flight information topic-specific reference 144 provided to the metadata generator 143 may be one of the topic value, the interpolated value, and the transition value of the flight information described above.

The image-metadata register 145 is configured to register received image data with metadata generated by the metadata generator 143 to generate new image data. Specifically, the image-metadata register 145 generates new image data by registering an image item in the image data transmitted from the image data acquisition unit 12 with metadata transmitted from the metadata generator 143, and stores the new image data in the image data storage unit 15.

The image data storage unit 15 stores the new image data in which the image item of the received image data is registered with the newly generated metadata as described above.

Meanwhile, the flight information storage unit 16 is configured to store flight information received from the flight information acquisition unit 13.

Next, based on the structure described above, a method of registering metadata regarding a drone image according to an embodiment of the present disclosure will be described.

Figure 3:
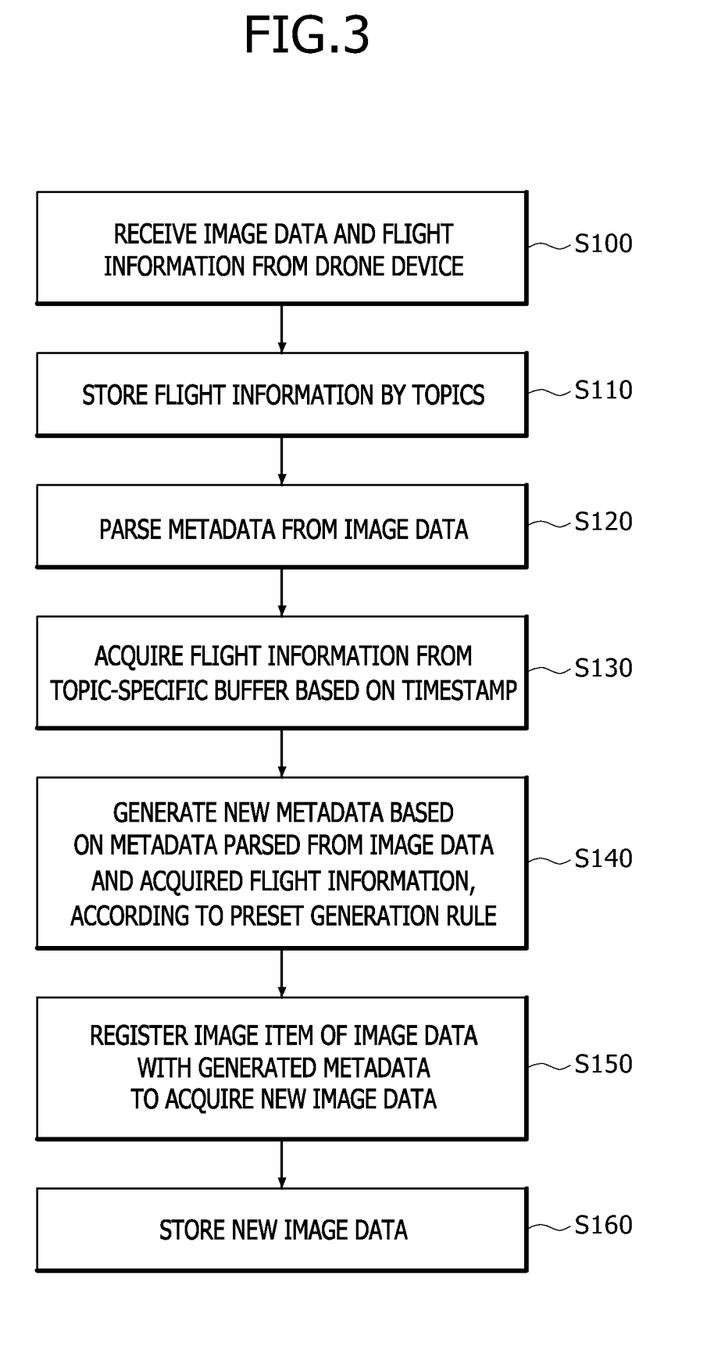
FIG. 3 is a flowchart showing a method of registering metadata of a drone image according to an embodiment of the present disclosure.

FIG. 3 is a flowchart of a method of registering metadata regarding a drone image according to an embodiment of the present disclosure.

The apparatus 1 for registering metadata acquires image data and flight information as captured data from the drone device 2 as shown in FIG. 3 (S100).

Flight information is stored in a topic-specific buffer (S110). Here, the flight information may be stored in a separate storage unit and managed. In addition, metadata is parsed from the image data, which is captured data (S120). Thereafter, new metadata having additional information is generated, and the generated metadata and the existing data are subject to registration or matching so that new data is generated.

In detail, based on a set timestamp (e.g., in the case of a still image, one of a photographing time, an imaging time, and a filing time, and in the case of a video stream, one of time information of each frame and frame number information or relative time information from the start of streaming), flight information corresponding thereto is acquired from the topic-specific buffer (S130). From the topic-specific buffer, flight information (a value of flight information) corresponding to a time matching the timestamp is acquired.

Thereafter, according to a pre-generated rule, new metadata is generated using the metadata parsed from the image data in operation S120 and the flight information acquired from the topic-specific buffer in operation S130 (S140).

Next, the new metadata is registered to an image region of the image data acquired in operation S100 to acquire new image data (S150). That is, new image data including the image item of the image data received from the drone device 2 while including the metadata newly generated based on the metadata, which is included in the existing image data, and the flight information is acquired.

As described above, flight information acquired through a separate sensor, such as a flight sensor, is registered to metadata of image data acquired from a drone, to generate new metadata, thereby providing image data having metadata that may fully satisfy mission requirements.

Figure 4:
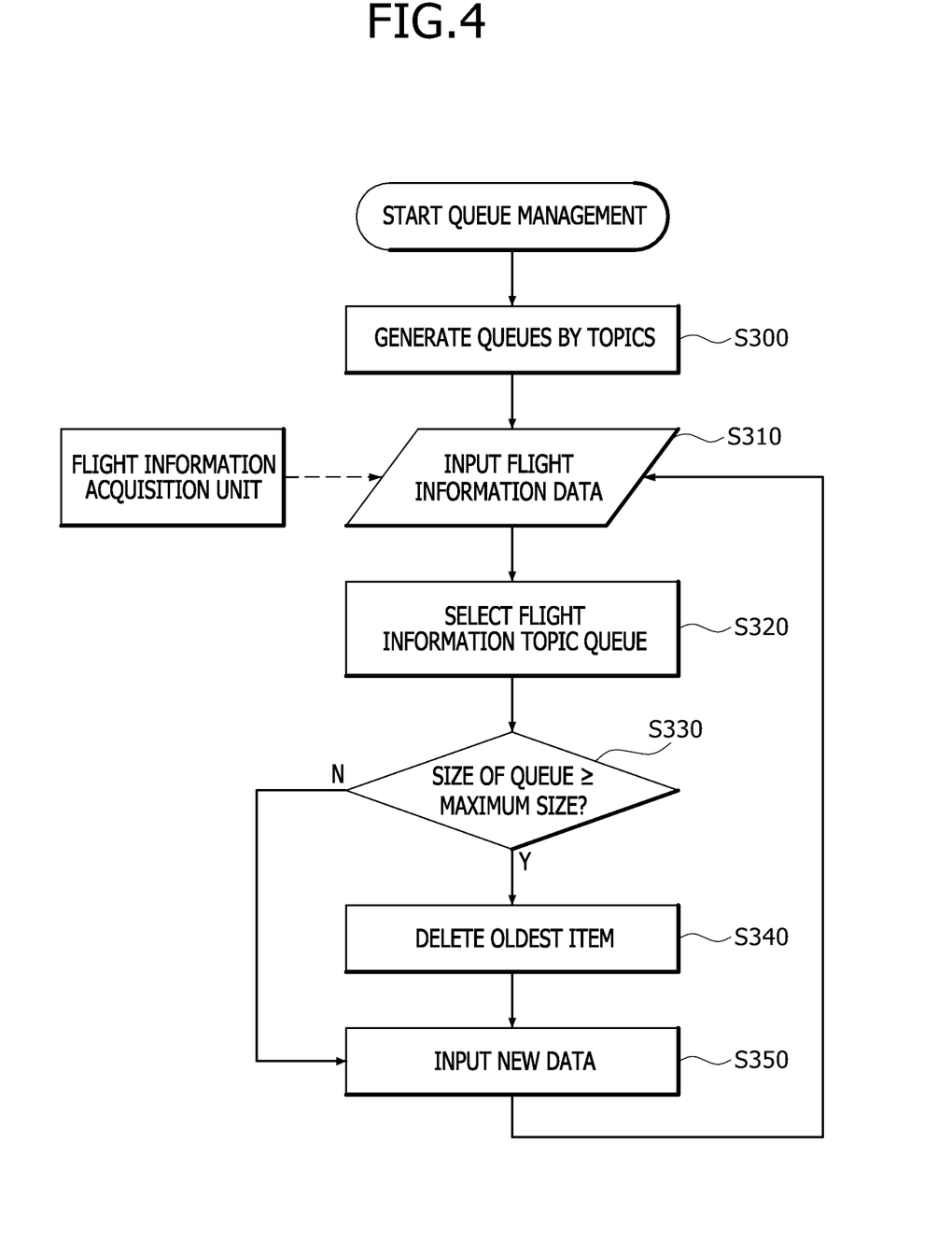
FIG. 4 is a flowchart showing a method of registering metadata regarding a drone image according to an embodiment of the present disclosure, which shows a process of managing topic-specific queue buffers by an apparatus for registering metadata.

FIG. 4 is a flowchart showing a method of registering metadata regarding a drone image according to an embodiment of the present disclosure, which shows a process of managing topic-specific queue buffers by an apparatus for registering metadata.

As shown in FIG. 4, for the management of the queue buffer, the flight information topic-specific queue manager 141 of the apparatus 1 for registering metadata generates queue buffers (or buffers) by topics (S300).

When flight information data is input from the flight information acquisition unit 13 in a state in which queue buffers are generated by topics (S310), the flight information topic-specific queue manager 141 selects a queue buffer of a certain topic (S320).

When the size of the selected topic queue buffer is greater than or equal to a preset maximum size, the flight information topic-specific queue manager 141 deletes the oldest item of the queue buffer of the corresponding topic (S330 and S340), and then, stores the input flight information data as new data in the corresponding topic queue (S350).

Meanwhile, when the size of the selected topic queue buffer is smaller than the preset maximum size, the flight information topic-specific queue manager 141 stores the input flight information data as new data in the corresponding topic queue (S350).

Figure 5:
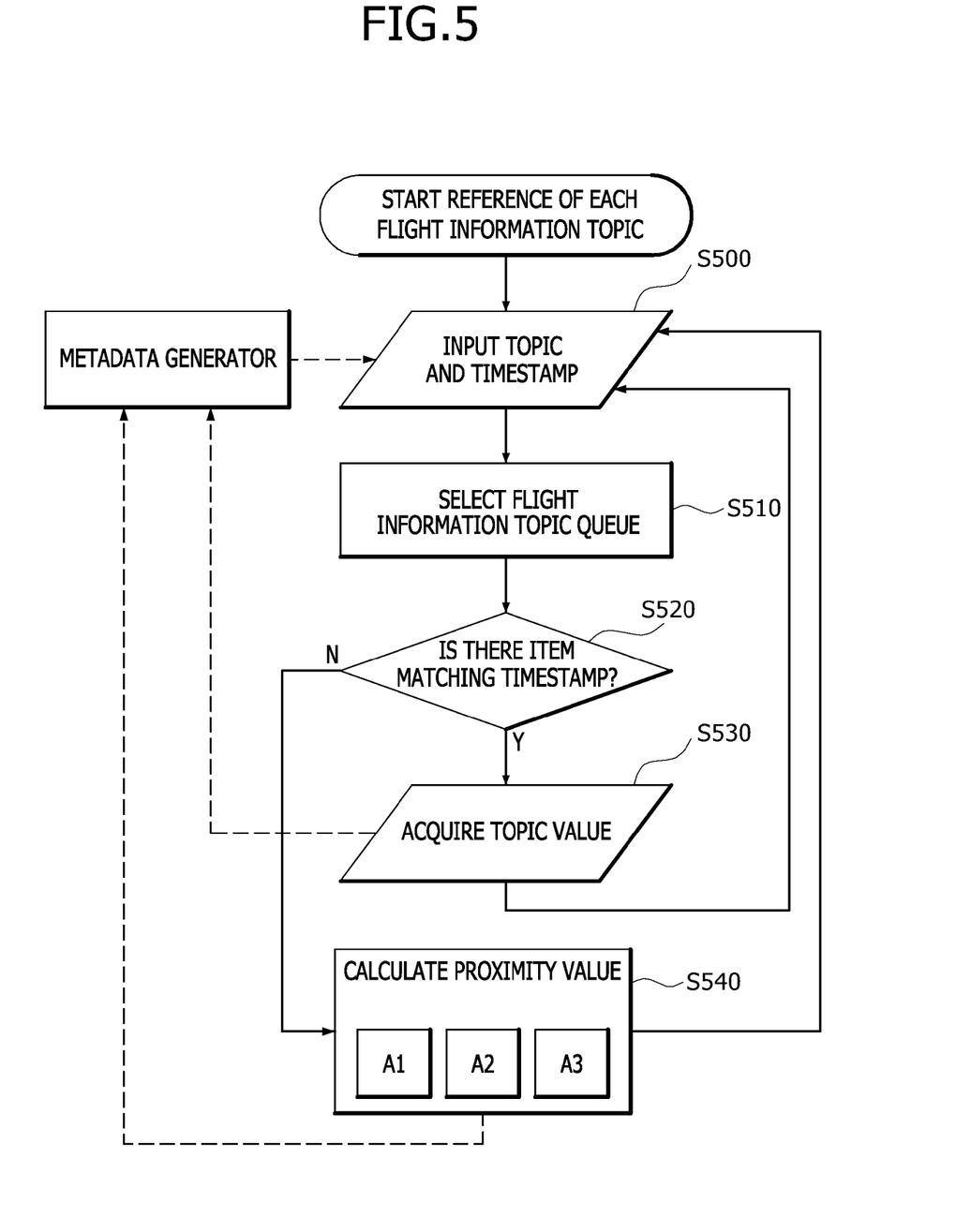
FIG. 5 is a flowchart showing a method of registering metadata regarding a drone image according to an embodiment of the present disclosure, which shows a process of acquiring flight information from topic-specific queue buffers by an apparatus for registering metadata.

FIG. 5 is a flowchart showing a method of registering metadata regarding a drone image according to an embodiment of the present disclosure, which shows a process of acquiring flight information from topic-specific queue buffers by an apparatus for registering metadata Referring to FIG. 5, the flight information topic-specific reference 144 of the apparatus 1 for registering metadata receives a topic and a timestamp from the metadata generator 143 (S500).

The flight information topic-specific reference 144 selects a queue buffer corresponding to the topic provided from the metadata generator 143 among queue buffers (or buffers) by topics (S510). Then, the flight information topic-specific reference 144 searches for a data item corresponding to the timestamp in the selected topic queue buffer.

When there is a data item having a reference value matching the timestamp in the selected topic queue buffer (S520), flight information of the corresponding data item, that is, a topic value, is acquired (S530). The acquired topic value (flight information) is provided to the metadata generator 143.

When there is no data item having a reference value matching the timestamp in the selected topic queue buffer, a data item having a reference value that is close to the timestamp is searched for, and a proximity value (flight information) based on a value of the data item having the close reference value is acquired (S540).

For example, a topic value of a data item having a reference value closest to the timestamp is acquired as a proximity value A1.

Alternatively, an interpolated value of topic values of data items of two reference values close to the timestamp is acquired as a proximity value A2. For example, when there is no reference value having time information matching a timestamp t1 in a queue corresponding to a location of flight information, an interpolated value of a first location value corresponding to a reference value t11 close to the timestamp t1 and a second location value corresponding to a reference value t12 close to the timestamp t1 is generated and acquired as a proximity value.

Alternatively, a transition value between topic values of N data items close to the timestamp is acquired as a proximity value A3. For example, a first location value corresponding to a reference value t11 close to the timestamp t1, a second location value corresponding to a reference value t12 close to the timestamp t1, a third location value corresponding to a reference value t13 close to the timestamp t1, and a fourth location value corresponding to a reference value t14 close to the timestamp t1 are subject to a separate calculation algorithm to calculate a transition value, and the transition value is used as a proximity value. For proximity value calculation, various curve fitting algorithms, such as linear interpolation, a B-spline curve, and a Bezier curve, may be applicable to suit a flight environment and motion characteristics (e.g., considering a difference in flight characteristics between fixed wing and rotary wing aircraft) of aircraft, such as drones.

The proximity value (flight information) acquired as described above is provided to the metadata generator 143.

Figure 6:
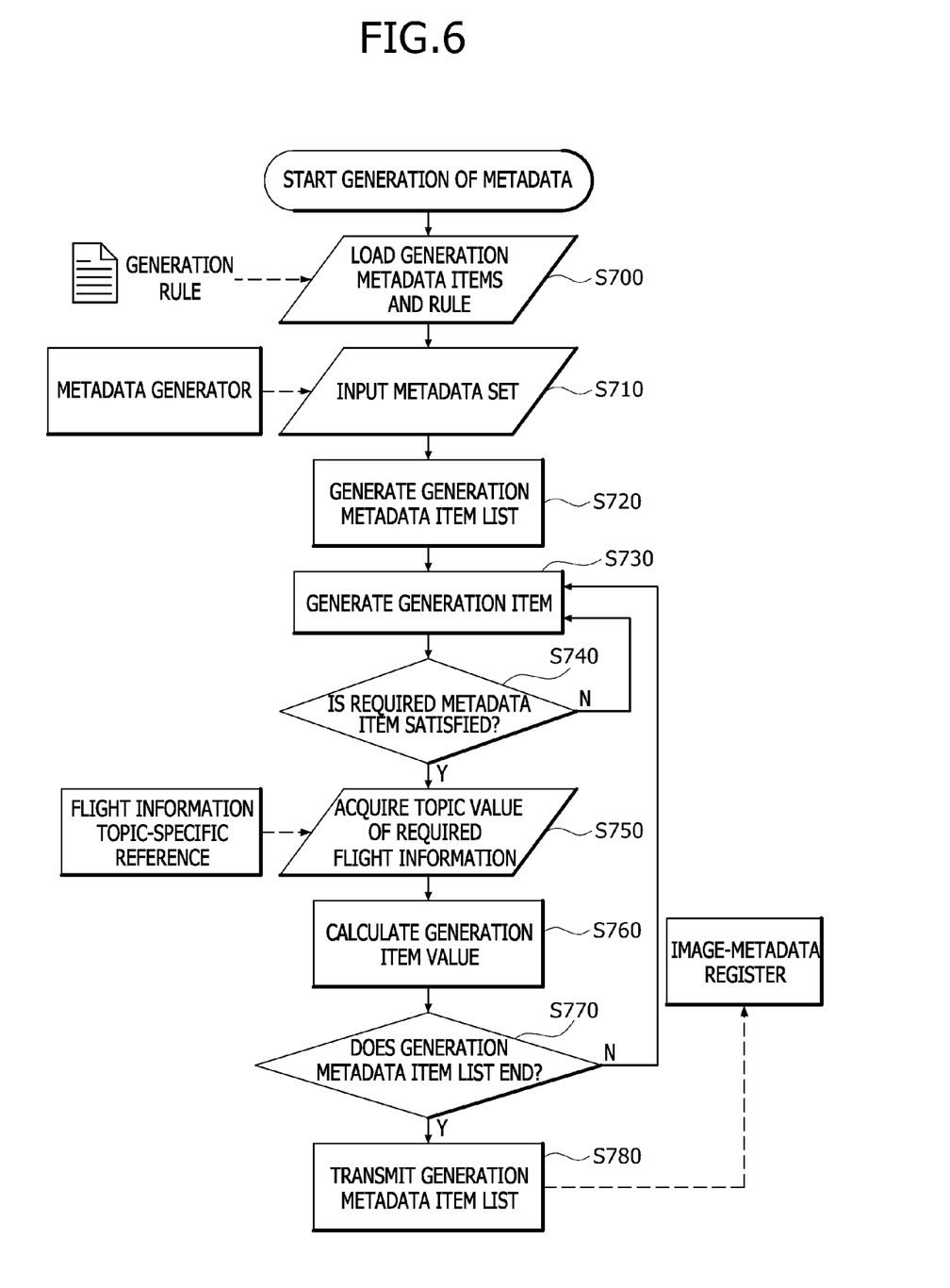
FIG. 6 is a flowchart showing a method of registering metadata regarding a drone image according to an embodiment of the present disclosure, which shows a process of registering metadata to generate new metadata by an apparatus for registering metadata.

FIG. 6 is a flowchart showing a method of registering metadata regarding a drone image according to an embodiment of the present disclosure, which shows a process of registering metadata to generate new metadata by an apparatus for registering metadata Referring to FIG. 6, the metadata generator 143 of the apparatus 1 for registering metadata loads a preset generation rule (S700). In addition, the metadata generator 143 receives metadata items of image data from the metadata parser 142 according to the generation rule. The metadata items of the image data are input as a metadata set (S710).

A generation metadata item list to be newly generated according to the generation rule is generated (S720).

One item is selected from the generation metadata item list (S730), and when the selected item does not satisfy a required metadata item, another item is selected from the list (S740).

When the selected item satisfies the required metadata item, flight information of a topic corresponding to the selected item is acquired from the flight information topic-specific reference 144 (S750). For example, a timestamp and a topic corresponding to the selected item are provided to the flight information topic-specific reference 144, and accordingly flight information (a topic value, a proximity value) of the corresponding topic is acquired (see FIG. 5).

Thereafter, based on the acquired flight information of the topic, a generation item value corresponding to the selected item is calculated (S760). Here, the generated item value may be calculated by additionally using the metadata item acquired from the metadata parser in operation S710.

When the generation item values are calculated for all items on the list generated in operation S720 through operations S730 to S760 (S770), a list including each of the calculated generation item values, that is, a generation metadata item list is transmitted to the image-metadata register 145 (S780). Accordingly, registration with image data is performed based on the newly generated metadata.

Meanwhile, in the method embodiments described above, the order in which operations are executed is not limited to the order described above, and may be executed in an order different from the described method.

According to the embodiment, digital image data generated by a drone image acquisition device is registered with metadata newly generated based on flight information related to an image and used, thereby improving the quality and reusability of the image data acquired by the drone.

In addition, since metadata generated using a timestamp of image data and flight information is registered to the image data itself, flight information (individually calculated by flight information topics), which is the closest to the flight characteristics of aircraft, such as a drone, is computed and recorded together with the image data. In particular, metadata may be recorded in a still image file. In addition, since metadata may be recorded for each frame in a video file (e.g., metadata as many as the number of frames), frame synchronization of flight information-based metadata and image data is achieved.

In addition, image data and flight information have irregular propagation delays due to different characteristics between transmission channels, but the embodiment of the disclosure is implemented to store flight information in buffers by topics, and select a topic value of flight information stored in the topic-specific buffer based on a timestamp, and use the selected topic value in generating metadata, thereby preventing errors from being accumulated due to changing irregular propagation delays.

Figure 7:
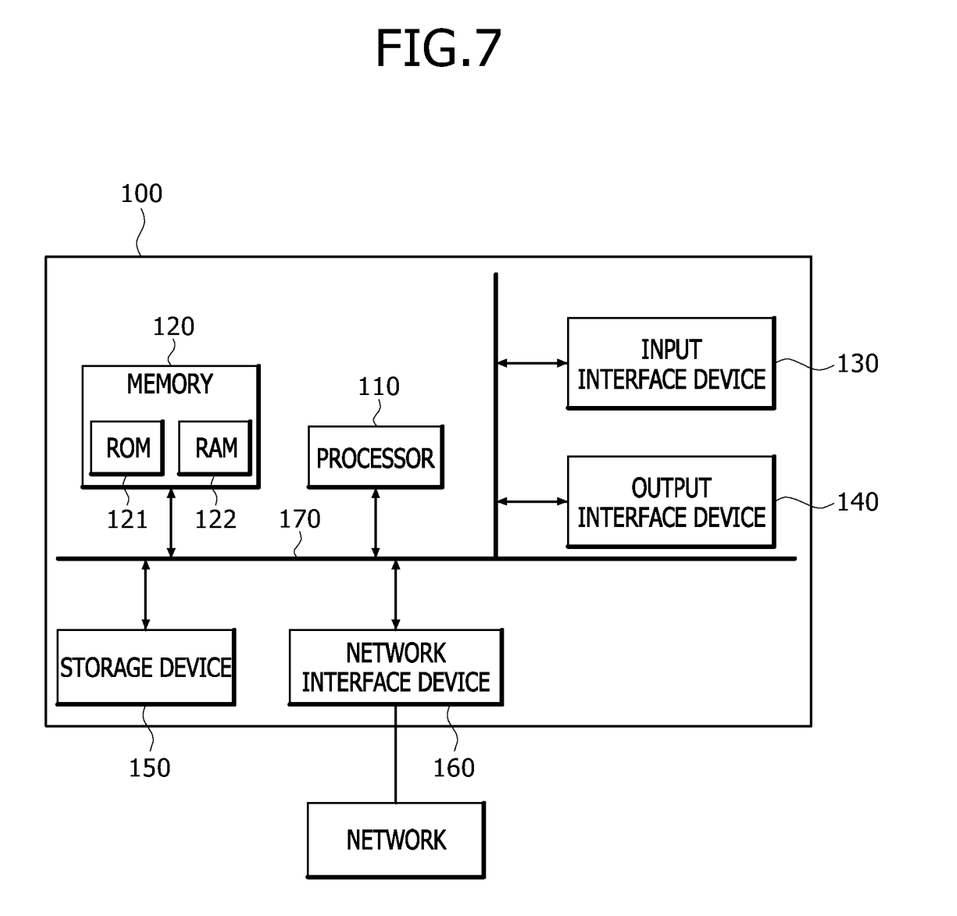
FIG. 7 is a block diagram illustrating a computing device for implementing a method according to an embodiment of the present disclosure.

FIG. 7 is a block diagram illustrating a computing device for implementing a method according to an embodiment of the present disclosure.

As shown in FIG. 7, the method of registering metadata according to the embodiment of the present disclosure may be implemented using a computing device 100.

The computing device 100 may include at least one of a processor 110, a memory 120, an input interface device 130, an output interface device 140, a storage device 150, and a network interface device 160. Each of the components may be connected by a bus 170 to communicate with each other. In addition, each of the components may be connected through an individual interface or an individual bus via the processor 110, rather than the common bus 170.

The processor 110 may be implemented in various types, such as an application processor (AP), a central processing unit (CPU), a graphics processing unit (GPU), and the like, and may be a semiconductor device for executing instructions stored in the memory 120 or the storage device 150. The processor 110 may execute program instructions stored in at least one of the memory 120 and the storage device 150. Such a processor 110 may be configured to implement the functions and methods described above based on FIGS. 1 to 6. For example, the processor 110 may be configured to perform the functions of the image data acquisition unit, the flight information acquisition unit, and the image-flight information registration processing unit.

The memory 120 and the storage device 150 may include various types of volatile or non-volatile storage media. For example, the memory may include a read-only memory (ROM) 121 and a random access memory (RAM) 122. In an embodiment of the present disclosure, the memory 120 may be located inside or outside the processor 110, and the memory 120 may be connected to the processor 110 through various known methods. For example, the storage device 150 may be configured to serve as the image data storage unit and the flight information data storage unit.

The input interface device 130 is configured to provide data (e.g., pre-generated production rules) to the processor 110, and the output interface device 140 is configured to output data from the processor 110.

The network interface device 160 may transmit or receive signals to or from another device (e.g., a drone) through a wired network or a wireless network.

The input interface device 130, the output interface device 140, and the network interface device 160 may be collectively referred to as "interface devices."

The computing device 100 having such a structure may be referred to as an apparatus for registering metadata and implement the above described methods according to the embodiment of the present disclosure.

In addition, at least a part of the method of registering metadata according to the embodiment of the present disclosure may be implemented as a program or software executed in the computing device 100, and the program or software may be stored in a computer-readable medium.

In addition, at least a part of the method of registering metadata according to the embodiment of the present disclosure may be implemented as hardware that may be electrically connected to the computing device 100.

The embodiments of the present disclosure described above are not implemented only through an apparatus and/or a method, but may be implemented through a program that realizes a function corresponding to the configuration of the embodiment of the present disclosure or a recording medium on which the program is recorded. Such an implementation can be easily implemented by an expert in the technical field to which the present disclosure pertains based on the description of the above-described embodiments.

According to embodiments, it is possible to receive digital image data generated by a drone image acquisition device and flight information related to the image and register the image data with metadata obtained from the flight information in real time without an operator's intervention. Accordingly, the time and manpower in a data combining process can be reduced, and the cost of developing new available services can be reduced.

In addition, it is possible to add a newly required metadata item without redevelopment or modification of the drone device, and minimize an operator's intervention while achieving automation, so that related costs can be reduced.

In addition, since the generated image data directly contains metadata, the quality and reusability of the image data can be improved. In addition, image data registered with metadata can be stored and distributed as a single file (file/stream), and at a later time, a situation in which the image data is acquired can be estimated based on the metadata recorded in the image data itself.

Although embodiments of the present disclosure have been described in detail above, the scope of the present disclosure is not limited thereto, and various modifications and improved forms of the present disclosure provided by those skilled in the art using the basic concept of the present disclosure as defined in the following claims can also fall within the scope of the present disclosure.

What is claimed is:

1. A method of registering metadata regarding a drone image, for improving analysis of objects within the drone image without modifying a drone device, the method comprising:

acquiring, by a registering apparatus, captured data from the drone device, the captured data including image data and flight information;

parsing, by the registering apparatus, metadata from the captured data;

generating, by the registering apparatus, new metadata with additional information and the parsed metadata; and acquiring, by the registering apparatus, new captured data by registration of the generated new metadata to an image region of the image data and the captured data, wherein the method further comprises storing the flight information in buffers by topics, and wherein the generating of the new metadata includes:

acquiring flight information corresponding to a timestamp from a buffer of a corresponding topic according to a pre-generated rule; and
generating new metadata using the acquired flight information and the parsed metadata.

2. The method of claim 1, wherein
the parsing of the metadata includes parsing metadata from the image data; and
the generating of the new metadata includes using the acquired flight information as the additional information, wherein new metadata is generated using the metadata parsed from the image data and the acquired flight information.

3. The method of claim 2, wherein flight information corresponding to a reference value is stored in the buffer, and the reference value includes a universal time coordinated (UTC) or a relative value corresponding to a system time after booting, and the topic includes a location and an attitude of the flight information.

4. The method of claim 3, wherein the acquiring of the flight information corresponding to the timestamp includes:
acquiring flight information of a data item having a reference value matching the timestamp in the buffer; and
when there is no data item having the reference value matching the timestamp, acquiring flight information of a data item having a reference value closest to the timestamp, or acquiring an interpolated value of pieces of flight information belonging to data items having two reference values close to the timestamp, or acquiring a transition value of pieces of flight information belonging to data items having N reference values close to the timestamp.

5. The method of claim 2, wherein, when the image data is a still image, the timestamp includes one of a photographing time, an imaging time, and a filing time, and when the image data is a moving image, the timestamp includes one of time information of a frame, frame number information of a frame, and relative time information from start of streaming.

6. The method of claim 2, wherein the generating of the new metadata includes:
generating a generation metadata item list according to a pre-generated rule;
acquiring, from the acquired flight information, flight information of a topic corresponding to each item of the generation metadata item list; and
acquiring a new item value based on the flight information of the topic acquired for each item and the parsed metadata.

7. An apparatus for registering metadata regarding a drone image, for improving analysis of objects within the drone image without modifying a drone device, the apparatus comprising:
at least one processor; and
memory including instructions, that when executed by the at least one processor, result in:
an image data acquisition unit configured to acquire image data from data received from the drone device;
a flight information acquisition unit configured to acquire flight information from flight information data received from the drone device; and
an image-flight information register configured to parse metadata from the image data, generate new metadata using the parsed metadata and the acquired flight information, and register the new metadata to an image region of the image data to acquire new image data,
wherein the image-flight information register includes:
a flight information topic-specific manager configured to store the flight information in buffers by topics,
a flight information topic-specific reference configured to acquire flight information corresponding to a timestamp from a buffer of a corresponding topic according to a pre-generated rule;
a metadata parser configured to parse metadata from the image data; and
a metadata generator configured to generate new metadata using the acquired flight information and the parsed metadata.

8. The apparatus of claim 7, wherein the image-flight information register further includes:
an image-metadata register configured to register the new metadata to an image region of the image data to acquire new image data.

9. The apparatus of claim 8, wherein the flight information topic-specific manager includes buffers by topics of flight information, and each of the buffers stores flight information to correspond to a reference value, and the reference value includes a universal time coordinated (UTC) or a relative value corresponding to a system time after booting, and the topic includes a location and an attitude of the flight information.

10. The apparatus of claim 9, wherein the flight information topic-specific reference is configured to:
acquire flight information of a data item having a reference value matching the timestamp in a buffer of a certain topic and provide the acquired flight information to the metadata generator; and
when there is no data item having the reference value matching the timestamp, acquire flight information of a data item having a reference value closest to the timestamp, acquire an interpolated value of pieces of flight information belonging to data items having two reference values close to the timestamp, or acquire a transition value of pieces of flight information belonging to data items having N reference values close to the timestamp, and provide the acquired flight information, the acquired interpolated value, or the acquired transition value to the metal data generator.

11. The apparatus of claim 8, wherein the timestamp, when the image data is a still image, includes one of a photographing time, an imaging time, and a filing time, and when the image data is a moving image, includes one of time information of a frame, frame number information of a frame, and relative time information from start of streaming.

12. The apparatus of claim 8, wherein the metadata generator is configured to:
generate a generation metadata item list according to a pre-generated rule;
acquire, by the flight information topic-specific reference, flight information of a topic corresponding to each item of the generation metadata item list; and
acquire a new item value based on the flight information of the topic acquired for each item and the parsed metadata.

13. The apparatus of claim 9, further comprising:
an image data storage in which new image data registered with the new metadata is stored; and a flight information storage unit configured to store flight information acquired by the flight information acquisition unit.

* * * * *